3,004,940
METHOD FOR INCORPORATING CARBON BLACK INTO RUBBER

William R. King, Borger, Tex., assignor to Phillips Petroleum Company, a corporation of Delaware
No Drawing. Filed June 20, 1958, Ser. No. 743,509
6 Claims. (Cl. 260—27)

This invention relates to the preparation of a carbon black slurry for use in the manufacture of rubber. In one aspect, it relates to the preparation of carbon black pellets for use in manufacture of rubber. In another aspect, the invention relates to the production of rubber having improved abrasion resistance properties and faster curing properties than prior art types of rubber.

In the manufacture of rubber, particularly synthetic rubber, the monomers which form the rubber, for example, butadiene and styrene, are polymerized in aqueous emulsion and after the unreacted butadiene and styrene are removed by flashing and by steam stripping, the latex is recovered. Carbon black is added to the latex in definite, predetermined amounts and is thoroughly mixed with the latex prior to the coagulation step wherein the rubber crumbs are formed. The carbon black is dispersed in water, usually with the aid of a dispersing agent, and such carbon black slurry is stored prior to being incorporated into the rubber latex. The latex and carbon black slurry are weighed in predetermined amounts on separate automatic loading dumping scales and the weighing hoppers of both scales are simultaneously dumped into a mixing tank when both hoppers have been filled with the required amount of materials. The mixture of carbon black slurry and rubber latex is called carbex.

Conventional practice of preparing rubber masterbatch involves disintegrating dry carbon black pellets and mixing the resulting dry carbon black into water to form a slurry. Dispersing agents, usually sodium lignin sulfonate, are added to the water to stabilize the carbon black dispersion. The carbex is coagulated to form the rubber masterbatch. A method and means for preparing the rubber masterbatch from the carbex are described and illustrated in copending application Serial No. 357,868, filed May 27, 1953, now Patent No. 2,921,767, by W. E. Wigham.

There are a number of disadvantages to the conventional methods of disintegrating dry carbon black pellets and mixing the disintegrated dry carbon black into water to form a slurry. One of these disadvantages is that the dry carbon black pellets have been heated by mechanical work exerted on the pellets during their formation and the hot black, in the presence of oxygen, is partially oxidized with the result that the abrasion resistance of the rubber wherein the black is incorporated, is lowered. The mixing of the dry pellets into a dilute water slurry is a dusty and cumbersome process. It is known that sodium lignin sulfonate, when used as the dispersing agent, has a detrimental effect upon the finished rubber. Sodium rosin acid soap can be used as a dispersing agent and has very little detrimental effect but is not satisfactory in the conventional process because the mixture foams excessively. Dry pelleting is a relatively expensive process and this adds to the manufacturing cost of the carbon black and to the finished rubber.

Conventional wet pelleted carbon black pellets display disadvantages similar to those of the dry pelleted carbon black pellets because of the oxidation which occurs in the high temperatures utilized in the drier. The dried wet pelleted carbon black pellets impart an increased modulus to the rubber prepared from such carbon black and this is detrimental for many uses. The drying operation is a costly step in the preparation of carbon black pellets.

Loose carbon black imparts beneficial properties to the rubber but the preparation of carbon black slurry from loose black has been so troublesome that the use of loose black has been substantially universally abandoned in favor of the pelleted carbon black.

It is the principal object of this invention to provide carbon black pellets which impart improved characteristics to the rubbers wherein such pellets are incorporated. It is also an object of this invention to provide an improved method for preparing a carbon black slurry from carbon black pellets. It is a further object of this invention to provide a method for making rubber having improved abrasion resistance and faster curing properties from a carbon black slurry prepared from pelleted carbon black. Other objects and advantages will be apparent to one skilled in the art upon studying this disclosure including the detailed description of the invention.

Broadly, the invention contemplates the use of undried, wet pelleted carbon black pellets for the preparation of a carbon black slurry for use in the preparation of a rubber masterbatch. I have discovered that the undried, wet pelleted carbon black pellets can be easily dispersed in water without the necessity for being disintegrated or pulverized and that the rubber prepared from such carbon black slurry has improved properties of abrasion resistance and also has faster curing properties. According to the practice of this invention, the carbon black is wet pelleted, but not dried. This is a relatively inexpensive operation, performed in relatively inexpensive equipment, which does not heat the carbon black as when the carbon black is dry pelleted. The amount of dispersant required to hold the carbon black in suspension in water is also reduced. The dispersant can be added directly to the carbon black during the pelleting process and because only gentle mixing is required to disintegrate the pellets in the water, sodium rosin acid soap can be used as the dispersant without fear of foaming. Conventional compounding agents and curing procedures are employed in preparing the rubber.

According to the practice of this invention, loose carbon black is wet pelleted in a pellet mill such as a conventional "pug mill." High rates of loose carbon black can be fed to a small pug mill and very little power is required to mix the loose carbon black and water together so as to form the wet pellets. The wet pellets are not dried but are transported directly to storage from whence they are drawn to make the slurry of carbon black in water. A particularly preferred method and means for preparing wet pelleted pellets is disclosed in my copending application Serial No. 647,408, filed March 20, 1957, now Patent No. 2,949,349.

The wet pellets may be considered to be a very concentrated slurry which is diluted by the addition of water. The required amount of wet pelleted carbon black pellets is dumped into water with a low concentration of dispersant, if desired. A moderate amount of stirring results in the formation of a slurry of carbon black in water. This slurry of carbon black in water is fed at a regulated rate into a stream of latex to form the carbex and the carbex solution is then coagulated by conventional means to produce the rubber masterbatch. This method of operation permits the release of the large and relatively expensive pellet mills for use in improving the quality of the dry pellets being produced for uses other than in preparing rubber masterbatch. Advantages resulting from the practice of the invention include reduction in carbon black plant investment and costs; simplification and reduction in cost in the preparation of the rubber masterbatch; and improved properties of the rubber so produced. The advantages gained by using the wet carbon black pellets more than offset the disadvantage of the added weight of the wet pellets over the dry pellets.

The wet pelleted carbon black pellets ordinarily will contain from about 48 to about 54 percent by weight of water as produced although the water content can be as low as about 40 and as high as 55 percent. These pellets are substantially dust free and display sufficient structural strength for normal handling and storage.

The following examples will be helpful in understanding the invention but are not to be construed as limiting the invention. In the following examples the latex was, in each case, a conventional butadiene-styrene copolymer prepared by conventional cold rubber process. High abrasion furnace black was utilized in each case; the dry pelleted carbon black pellets were prepared by conventional dry pelleting process and were disintegrated in a pulverizer type grinder before being slurried in water; and the wet pelleted carbon black pellets were pelleted according to the process disclosed in copending application Serial No. 647,408, filed March 20, 1957, except that the drying step was omitted. The wet pelleted carbon black pellets were dispersed in water without being disintegrated in the pulverizer. About 7 parts by weight per 100 parts of carbon black of sodium rosin acid soap was used in each slurry and about 1 part by weight per 100 parts of carbon black of potassium hydroxide was used in each slurry for pH control. Properties of the prepared slurries are summarized in Table I.

TABLE I

*Carbon black slurries*

|  | A | B | C |
|---|---|---|---|
| Black Form | Loose | Wet Pellets | Pulverized Dry Pellets. |
| Slurry pH | 10.4 | 12.3 | 10.5 |
| Solids, Theoretical | 14.2 | 17.8 | 15.3 |
| Solids, Measured | 14.1 | 17.7 | 15.0 |
| Black Retained on 200-Mesh Screen, Percent | 0 | 4.1 | 0 |
| Brookfield Viscosity | 410 | 270 | 190 |

All carbexes were prepared by addition of carbon black slurry to latex followed by gentle agitation for about 30 minutes. The carbex was then poured into a hot (100–110° F.) dilute sulfuric acid coagulant which contained approximately 1.7 pounds of concentrated sulfuric acid and 0.25 pound of glue per 100 pounds of masterbatch. Coagulation was accomplished in a glass-lined tank. Each coagulation lot of masterbatch was given two hot (120° F.) acid washes and one water wash at room temperature. All masterbatches were dried in a tray drier to moisture contents below one percent.

The 4 percent of the wet pelleted carbon black which failed to pass a 200 mesh screen in the wet screen test on the slurry resulted from dry inclusions in the wet pellets and was observed to be not dispersed in the masterbatch prepared from this slurry. Satisfactory carbon black dispersion was obtained when the masterbatch was subjected to a normal milling cycle.

Rubber stocks were compounded for evaluation according to the following recipes and the curing temperature was 307° F.

TABLE II

*Compounding recipe*

| Components | Parts by Weight |
|---|---|
| Masterbatch | 150 |
| Zinc Oxide | 3 |
| Stearic Acid | 2 |
| Circo-Para [1] | 10 |
| Flexamine (65% of a complex diarylamine-ketone reaction product and 35% of N,N'-diphenyl-p-phenylenediamine) | 1 |
| Santocure (N-cyclohexyl-2-benzothiazylsulfenamide) | 1.2 |
| Sulfur | 1.75 |

[1] A 50:50 mixture of Circosol-2XH with ParaFlux.

Circosol-2XH: A petroleum hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 2000 seconds.

Para Flux: Saturated polymerized hydrocarbon.

Cure state as measured by compresison set, modulus and elongation is shown in Table III. The ASTM Method D, Compression Set Test, was used. Optimum cure by compression set in this evaluation is about 30 percent at 30 minutes cure time. Stocks made with loose black and wet black pellets were faster curing than the stocks made with pulverized black pellets.

TABLE III

*Cure properties of rubber stocks*

MASTERBATCH WITH LOOSE CARBON BLACK

| Santocure, Parts Per 100 Parts of Copolymer | Compound Mooney | | Compression Set, Percent Minutes Cure at 307° F. | | | 300% Modulus, p.s.i., Minutes Cure at 307° F. | | | Elongation, Percent Minutes, Cure at 307° F. | | |
|---|---|---|---|---|---|---|---|---|---|---|---|
|  | ML-1½ | ML-4 | 20 | 30 | 45 | 20 | 30 | 45 | 20 | 30 | 45 |
| 1.2 | 55 | 50 | 49.3 | 27.9 | 17.6 | 1,175 | 1,570 | 1,860 | 660 | 570 | 500 |
| 1.4 | 56 | 49 | 44.7 | 24.9 | 14.5 | 1,340 | 1,825 | 1,990 | 600 | 495 | 490 |

MASTERBATCH WITH PULVERIZED DRY CARBON BLACK PELLETS

| | | | | | | | | | | | |
|---|---|---|---|---|---|---|---|---|---|---|---|
| 1.2 | 52 | 47 | 57.2 | 33.4 | 20.9 | 700 | 1,225 | 1,410 | 790 | 635 | 615 |
| 1.4 | 51 | 47 | 51.7 | 30.1 | 17.3 | 990 | 1,360 | 1,500 | 715 | 610 | 580 |

MASTERBATCH WITH WET PELLETED CARBON BLACK PELLETS

| | | | | | | | | | | | |
|---|---|---|---|---|---|---|---|---|---|---|---|
| 1.2 | 57 | 50 | 50.2 | 27.2 | 16.9 | 1,325 | 1,880 | 2,125 | 625 | 510 | 490 |
| 1.4 | 56 | 51 | 44 | 24 | 14.4 | 1,600 | 1,960 | 2,050 | 585 | 485 | 435 |

The stress-strain properties of the rubber stock prepared with wet carbon black pellets in the masterbatch were similar to the properties of the rubber prepared from a masterbatch made of loose carbon black. These properties are shown in the following Table IV.

Reasonable variations and modifications are possible within the scope of the disclosure of the present invention without departing from the spirit and scope of the invention.

TABLE IV
*Stress-strain properties of rubber stock*

LOOSE CARBON BLACK

| Santocure, phr. | 300% Modulus, p.s.i. | | 80 F.—Unaged | | | | 212° F. Maximum Tensile, p.s.i. | 80 F.—Aged [a] | | | |
|---|---|---|---|---|---|---|---|---|---|---|---|
| | | | Tensile, p.s.i. | | Elongation, percent | | | Tensile, p.s.i. | | Elongation, percent | |
| | 30 [b] | 45 | 30 | 45 | 30 | 45 | | 30 | 45 | 30 | 45 |
| 1.2 | 1,570 | 1,860 | 3,575 | 3,640 | 570 | 500 | 1,775 | 3,125 | 2,880 | 295 | 325 |
| 1.4 | 1,825 | 1,990 | 3,475 | 3,675 | 495 | 490 | 1,760 | 2,990 | 3,040 | 270 | 300 |

PULVERIZED DRY CARBON BLACK PELLETS

| 1.2 | 1,225 | 1,410 | 3,400 | 3,780 | 635 | 615 | 1,650 | 3,240 | 3,260 | 365 | 385 |
| 1.4 | 1,360 | 1,500 | 3,475 | 3,580 | 610 | 580 | 1,610 | 3,090 | 3,225 | 330 | 380 |

WET CARBON BLACK PELLETS

| 1.2 | 1,880 | 2,125 | 3,420 | 3,620 | 510 | 490 | 1,700 | 2,900 | 3,125 | 260 | 295 |
| 1.4 | 1,960 | 2,050 | 3,460 | 3,225 | 485 | 435 | 1,650 | 3,025 | 3,200 | 265 | 305 |

[a] Aged 70 hours at 212 F.
[b] Minutes cure at 307 F.

The rubber stock prepared from carbon black slurry made with wet carbon black pellets exhibited superior abrasion resistance to the rubber prepared from a carbon black slurry made with pulverized dry carbon black pellets and approached the abrasion resistance of the rubber made with a carbon black slurry made from loose carbon black. A comparable rubber stock made from a carbon black slurry prepared with pulverized dry carbon black pellets and sodium lignin sulfonate as dispersing agent instead of sodium rosin acid soap had an abrasion loss of 11.08. Abrasion, flex life, and abrasion properties are given in Table V.

TABLE V
*Abrasion, flex life and hysteresis properties of rubber stock*

LOOSE CARBON BLACK

| Santocure, phr. | Temperature Rise, Δ T, F. | | | | Resilience, percent | | Flex Life, M | | Abrasion Loss [b] cc. |
|---|---|---|---|---|---|---|---|---|---|
| | 100 F. Oven [c] | | 200 F. Oven [d] | | | | | | |
| | 45 [a] | 60 | 45 | 60 | 45 | 60 | 30 | 45 | |
| 1.2 | 57 | 53 | 66 | 82 | 58.6 | 59.7 | 51.8 | 38.5 | 6.41 |
| 1.4 | 52 | 50 | 57 | 69 | 61.7 | 60.3 | 43.7 | 29.3 | 5.98 |

PULVERIZED DRY CARBON BLACK PELLETS

| 1.2 | 59 | 54 | 73 | 93 | 57.6 | 59.5 | 80.1 | 63.4 | 9.36 |
| 1.4 | 56 | 51 | 64 | 81 | 59.7 | 60.8 | 51.6 | 72.0 | 10.77 |

WET CARBON BLACK PELLETS

| 1.2 | 57 | 52 | 64 | 81 | 59.0 | 60.3 | 63.0 | 53.5 | 7.91 |
| 1.4 | 53 | 51 | 51 | 66 | 61.8 | 61.5 | 38.7 | 33.6 | 7.10 |

[a] Minutes cure at 307 F.
[b] 45 minutes cure at 307 F.
[c] 17.5% compression set.
[d] 22.5% compression set.

The dry carbon black pellets were disintegrated for dispersing in water with a "Mikro-Pulverizer" grinder manufactured by the Pulverizing Machinery Division, Metals Disintegrating Company, Inc., Summit, New Jersey.

That which is claimed is:

1. A method for the manufacture of rubber having improved abrasion resistance properties which comprises slurrying water and undried carbon black pellets, said pellets containing from about 40 to about 55 weight percent water, obtaining a dispersion of carbon black in water; admixing said dispersion with a rubber latex; coagulating the resulting mixture to form a coagulum of rubber; adding curing agents to the rubber; and curing the rubber.

2. A method for the manufacture of rubber having improved abrasion resistance properties which comprises slurrying water and undried carbon black pellets, said pellets containing from about 48 to about 54 weight percent water, obtaining a dispersion of carbon black in water; admixing said dispersion with a rubber latex; coagulating the resulting mixture to form a coagulum of rubber; adding curing agents to the rubber; and curing the rubber.

3. A method for the manufacture of rubber having improved abrasion resistance properties which comprises slurrying water and undried wet pelleted carbon black pellets containing from about 40 to 55 weight percent water, obtaining a dispersion of carbon black in water; admixing said dispersion with a rubber latex; coagulating the resulting mixture to form a coagulum of rubber; adding curing agents to said rubber; and curing said rubber.

4. The method of claim 1 wherein a dispersing agent is added to the water with the carbon black pellets.

5. The method of claim 4 wherein the dispersing agent is sodium rosin acid soap.

6. A method for the manufacture of rubber having improved properties which comprises slurrying water and carbon black pellets made by the wet pelleting process and containing the water employed in the formation of the pellets, said pellets containing about 40 to 55 weight percent water, obtaining a dispersion of carbon black in water; admixing said dispersion with a rubber latex; coagulating the resulting mixture to form a coagulum of rubber; adding curing agents to the rubber; and curing the rubber.

References Cited in the file of this patent

UNITED STATES PATENTS

| | | |
|---|---|---|
| 2,427,238 | Swart | Sept. 9, 1947 |
| 2,432,461 | Vesce | Dec. 9, 1947 |
| 2,769,795 | Braendle | Nov. 6, 1956 |